Figure 1:
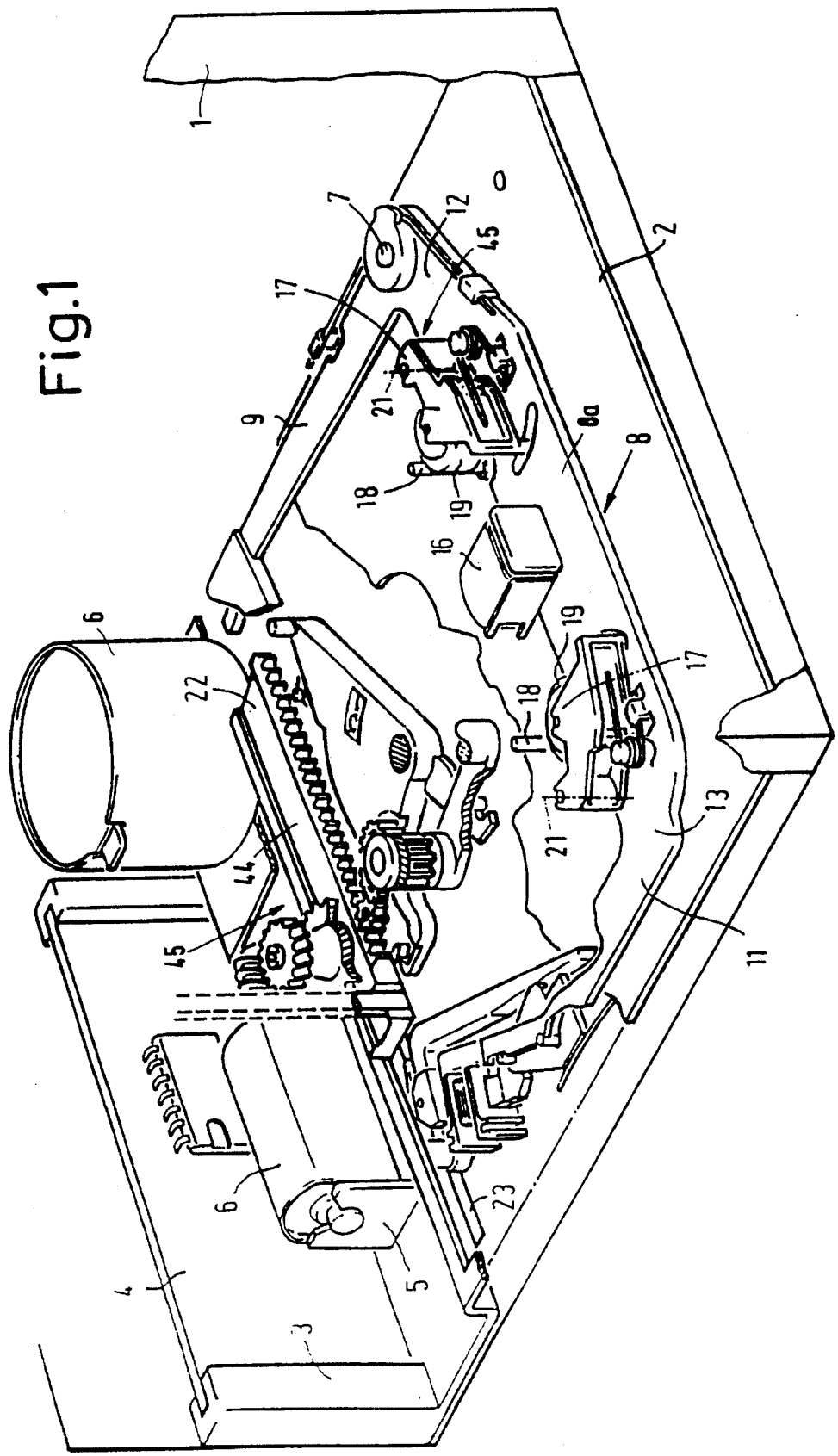

United States Patent [19]
Kämmler et al.

[11] Patent Number: 5,479,305
[45] Date of Patent: Dec. 26, 1995

[54] TECHNICAL DEVICE PARTICULARLY AN ELECTROMECHANICAL DECK FOR MOVING INFORMATION CARRIERS HAVING A MOVABLE PLASTIC ELEMENT

[75] Inventors: Georg Kämmler, Berlin, Germany; Herbert Platzer, Eindhoven, Netherlands

[73] Assignee: U.S. Philips Corporation, New York, N.Y.

[21] Appl. No.: 139,492

[22] Filed: Oct. 19, 1993

[30] Foreign Application Priority Data

Oct. 27, 1992 [DE] Germany ............... 42 36 181.8

[51] Int. Cl.⁶ ............... G11B 5/008; G11B 5/54; G11B 21/22
[52] U.S. Cl. ............... 360/96.5; 360/105; 369/255
[58] Field of Search ............... 360/96.5, 105; 369/75.1, 244, 255

[56] References Cited

U.S. PATENT DOCUMENTS 5,126,184  6/1992  Yabe ........................... 428/131
5,198,943  3/1993  Kunze ........................ 360/96.5

FOREIGN PATENT DOCUMENTS 3911746  10/1990  Germany .
57-197139  12/1982  Japan .

Primary Examiner—A. J. Heinz
Attorney, Agent, or Firm—Brian J. Wieghaus

[57] ABSTRACT

An technical device, particularly an electromechanical deck for moving information carriers, has one plastics part formed on a deck plate, which part has been moulded onto the deck plate by outsert-moulding and has at least one bridge element which traverses a hole in the deck plate, and retaining elements, which are situated at the deck plate surfaces and are interconnected by a bridge element, the plastics of said part being subject to shrinkage after injection-moulding, the mobility of the plastics part relative to the deck plate as a rotatable or slidable part being obtained automatically through its shrinkage by the following construction:

1. the bridge element is provided with retaining elements at only one of the deck plate surfaces;
2. the diameter of the hole in the deck plate widens towards the surface which is free of retaining elements;
3. the bridge element has a flange which fills the portion of widened diameter when the plastics is injected during injection-moulding.

10 Claims, 2 Drawing Sheets

TECHNICAL DEVICE PARTICULARLY AN ELECTROMECHANICAL DECK FOR MOVING INFORMATION CARRIERS HAVING A MOVABLE PLASTIC ELEMENT

The invention relates to a technical device, particularly an electromechanical deck for moving information carriers, the device comprising at least one plastics function part formed on a deck plate, which part has been moulded onto the deck plate by outsert-moulding and comprises at least one bridge element, which traverses a hole in the deck plate, and retaining elements, which are situated at the deck plate surfaces and are interconnected by the bridge element, the plastics of said part being subject to shrinkage after injection-moulding.

Technical devices comprising metal supporting plates having moulded-on plastics parts are known. The technique of manufacturing such metal supporting plates is known as outsert-moulding. The function pans formed on the metal supporting plate are intended for a variety of purposes, such as retaining, supporting or guiding further function pans. The moulded-on pans and the metal supporting plate are always joined in that moulded plastics retaining elements formed at opposite sides of a hole in the metal plate are interconnected by a bridge element traversing the hole. The length reduction of the bridge element as a result of the inevitable shrinkage of the plastics after moulding causes the retaining elements to be drawn towards both plate surfaces. This results in a comparatively tight fit which just allows a rotation into a desired position but which is not comparable to a bearing construction whose pans in operation constantly perform a movement, for example a rotation or translation.

From DE 39 11 746 C2 (PI-ID 89-053) it is known to provide a mobility similar to that of a rotary or sliding bearing by deformation of the moulded-on material after the moulding process.

From JP 57-197139 A it is known to interpose between the mould cavity for a retaining element of the kind described and the associated plate surface a spacer which should be retained very carefully and reliably during the moulding process. After moulding this spacer is removed to provide the mobility of the moulded-on pan. The insertion, retention and subsequent removal of the spacer render the process too laborious for mass production.

It has also been proposed to provide a different shrinkage force and thus a greater or smaller mobility at the corresponding bearing locations by varying the thickness of the retaining elements. However, the resulting mobility is inadequate for the construction of lever or wheel bearings. In addition, the retaining elements around the hole in the metal plate cannot be made arbitrarily thin because in such cases it is no longer guaranteed that the hole with the bridge element and the retaining elements connected thereto is filled correctly during injection moulding. Moreover, the mechanical strength of a connection of function pans to very thin retaining elements is inadequate.

It is an object of the invention to construct function pans formed on a deck plate in a deck of a technical device during moulding by means of an outsert-moulding technique in such a manner that they provide the rotation or translation capability required in operation without a subsequent operation being necessary.

According to the invention this object is achieved in that the mobility of the function part relative to the deck plate as a rotatable or slidable part is obtained automatically through its shrinkage by the following construction:

1. the bridge element is provided with retaining elements at only one of the deck plate surfaces;
2. the diameter of the hole in the deck plate widens towards the surface which is free of retaining elements;
3. the bridge element has a flange which fills the portion of widened diameter when the plastics is injected during injection-moulding.

When the function part is thus constructed within the scope of the moulding process the mobility of this part after shrinkage is such that it is freely movable to the required extent during operation of the device. The clearance between the function part and the deck plate in order to provide the desired mobility is simply obtained through shrinkage.

In a further embodiment of the invention the widened portion of the hole is substantially conical. A conically widened portion shrankes to a certain amount, which results in a predictable clearance between the bridge element flange and the wall of the hole in the deck plate.

In a further embodiment of the invention the angle a of taper between the deck plate surface and the conically widened portion is approximately 40° to 50°, and preferably 45°. It has been found that a taper of 40° to 50°, preferably 45°, is particularly suitable to provide the required mobility. Obviously, other angles are possible, a change of the angle toward 0° reducing the freedom of rotation and a change of the angle toward 90° reducing the guidance provided by the hole.

In a further embodiment of the invention the function part is a rotary bearing part or a sliding part, which parts are supported on the deck plate so as to be freely movable. The construction in accordance with the invention is equally suitable for both types of movable function parts.

Figure 2:
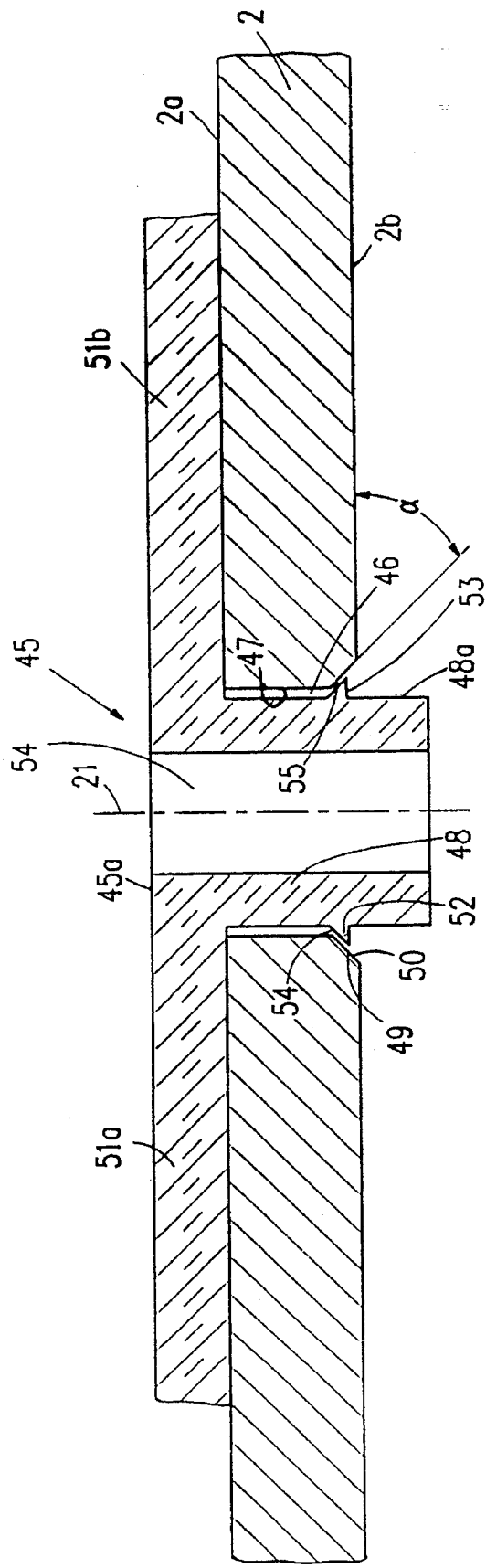

The invention will now be described in more detail with reference to the drawings. In the drawings:

FIG. 1 diagrammatically shows a device, particularly a deck for an information carriers in the form of a tape, which device forms part of a car radio, and FIG. 2 is a sectional view of a metal deck plate with a function pan moulded on by outsert-moulding, which function part is rotatable or translatable relative to this deck plate after it has been moulded onto this plate.

FIG. 1 shows the deck plate 2 of a device 1, for example a magnetic-tape-cassette deck of a car radio, on which deck plate stationary plastics parts have been mounted by an outsert-moulding technique. Such stationary function pans 3 may be, for example, a circuit board 4, or supports 5 for a motor 6. The plastics is preferably a semi-crystalline thermoplastic whose shrinkage without loading material is of the order of magnitude of 1% to 3%. The shrinkage can be reduced even further by the addition of loading materials. This has the advantage that the bridge element width can be increased and canting is reduced. A head-mounting plate 8 is arranged on the deck plate 2 so as to be pivotable about an axis 7 and has limbs 9 and 11 at corner areas 12 and 13. The base 8a of the head-mounting plate carries a magnetic head 16 and pressure rollers 19 cooperating with capstans 18 via supports 17.

The supports 17 of the pressure rollers 19 are pivotable about axes 21 and form function pans. The deck plate 2 has a slot 23 in which a slide 44, which also forms a function part, is movable.

FIG. 2 is a sectional view showing a bearing 45 of the support 17 with an axis 21. The stationary part of the bearing 45 is formed by the metal deck plate 2 with a hole 46. The movable part is formed by an injection-moulded plastics function part 45a. The hole 46 of the bearing 45 is circular or slotted and has an inner wall 47 adapted to cooperate with the bridge element 48.

The inner wall 47 of the hole 46 extends through the plate 2 from one plate surface 2a to the other plate surface 2b. As is shown in FIG. 2, the inner wall 47 has a conical portion 49 of increasing diameter in the area of the plate surface 2b, which portion widens in the direction from the plate surface 2a to the plate surface 2b. The angle α between the surface 50 of the portion 49 and the plate surface 2b is approximately 45°.

The movable function part 45a of the bearing 45 is formed by the bridge element 48, the retaining elements 51a and 51b, and a flange 52 on the bridge element. The movable function part 45a is moulded onto the plate 2 in an injection-moulding process. The retaining elements 51a and 51b are then formed directly on the plate surface 2a, which elements may be separated from one another or integral with one another. The flange 52 is obtained during injection-moulding in that the injection-moulding die lies close to the outer wall 48a of the bridge element to be moulded and the tapered space 53 is filled with a plastics to form the flange 52. Preferably, the bridge element 48 is moulded in such a manner that a centre hole 54 is formed.

When the plastics shrinks after injection the bridge element 48 shrinks both in the radial and in the axial direction. This causes the flange 52 to move both radially inward and in an axial direction towards the retaining elements 51a and 51b. The combination of radial and axial shrinkage results in a gap 55 being formed between the flange wall 54 and the wall 50 of the widened portion, which gap provides the mobility of the function part 45a.

If the inner wall 47 of the hole 46 is circular the injection-moulded bridge element 48 will also be circular and the function part 45a will be a freely rotatable part after injection-moulding. If the hole 46 is a slot, such as the slot 23 in FIG. 1, the bridge element 48 will be strip-shaped and the function part 45a will be a slidable part.

We claim:

1. A technical device, particularly an electromechanical deck for moving information carriers, the device comprising at least one plastics part (45a) formed on a deck plate (2), which part has been moulded onto the deck plate (2) by outsert-moulding and comprises at least one bridge element (48), which traverses a hole (46) in the deck plate (2), and retaining elements (51a, 51b), which are situated at the deck plate surfaces (2a) and are interconnected by the bridge element (48), the plastics of said part being subject to shrinkage after injection-moulding, characterized in that the mobility of the part (45a) relative to the deck plate (2) as a rotatable or slidable part is obtained automatically through its shrinkage by the following construction:
   1. the bridge element (48) is provided with retaining elements (51a, 51b) at only one of the deck plate surfaces (2a);
   2. the diameter of the hole (46) in the deck plate (2) widens only towards the surface (2b) which is free of retaining elements;
   3. the bridge element (48) has a flange (52) which fills the portion (49) of widened diameter when the plastics is injected during injection-moulding.

2. A technical device as claimed in claim 1, characterized in that the widened portion (49) of the hole is substantially conical.

3. A technical device as claimed in claim 2, characterized in that the angle α of taper between the deck plate surface (2b) and the conically widened portion (49) is approximately 40° to 50°.

4. A technical device as claimed in any one of the claim 3, characterized in that the plastics part (45a) is a rotary bearing part (45) or a sliding part (44), which parts are supported on the deck plate (2) so as to be freely movable.

5. A technical device as claimed in claim 2, characterized in that the plastics part is a rotary bearing part or a sliding part, which parts are supported on the deck plate so as to be freely movable.

6. A technical device as claimed in claim 2, characterized in that the angle of taper between the deck plate surface (2b) and the conically widened portion (49) is 45°.

7. A technical device as claimed in claim 1, characterized in that the angle α of taper between the deck plate surface and the conically widened portion is approximately 40° to 50°.

8. A technical device as claimed in claim 7, characterized in that the plastics part is a rotary bearing part or a sliding part, which parts are supported on the deck plate so as to be freely movable.

9. A technical device as claimed in claim 1, characterized in that the angle of taper between the deck plate surface (2b) and the conically widened portion (49) is 45°.

10. A technical device as claimed in claim 1, characterized in that the plastics part is a rotary bearing part or a sliding part, which parts are supported on the deck plate so as to be freely movable.

* * * * *